United States Patent [19]
Short

[11] 3,872,985
[45] Mar. 25, 1975

[54] HYDRAULIC CONTROL VALVE CIRCUIT

[75] Inventor: Arthur G. Short, Bettendorf, Iowa

[73] Assignee: J. C. Case Company, Racine, Wis.

[22] Filed: Feb. 14, 1972

[21] Appl. No.: 226,224

Related U.S. Application Data
[63] Continuation of Ser. No. 13,582, Feb. 24, 1970, abandoned.

[52] U.S. Cl. ............................ 214/138 R, 214/151
[51] Int. Cl. ............................................. B66f 9/00
[58] Field of Search .......... 214/138, 151, 130, 132; 212/66

[56] References Cited
UNITED STATES PATENTS

| | | | |
|---|---|---|---|
| 3,047,171 | 7/1962 | Long | 214/138 R |
| 3,108,699 | 10/1963 | Anschutz | 214/1 P |
| 3,220,577 | 11/1965 | Laverne | 214/503 |
| 3,275,163 | 9/1966 | Schaeff | 214/138 R |
| 3,343,686 | 9/1967 | Bjerkan | 212/66 |
| 3,630,120 | 12/1971 | Carlson | 214/138 R |

*Primary Examiner*—Robert J. Spar
*Assistant Examiner*—John Mannix
*Attorney, Agent, or Firm*—Dressler, Goldsmith, Clement & Gordon, Ltd.

[57] ABSTRACT

A hydraulic system in a material handling device in which a movable member is rotated about a pivot point, by a pair of hydraulic motors reversibly operable in response to the selective application of hydraulic pressure thereto. The hydraulic pressure for operating the hydraulic motors is connected thereto through a hydraulic switching valve responsive to the position of said movable member where one hydraulic motor would normally oppose further rotation of the movable member to modify the hydraulic connections to that hydraulic motor in response to said member reaching that position whereby further rotation of the movable member is effected without opposition from the hydraulic motor.

2 Claims, 16 Drawing Figures

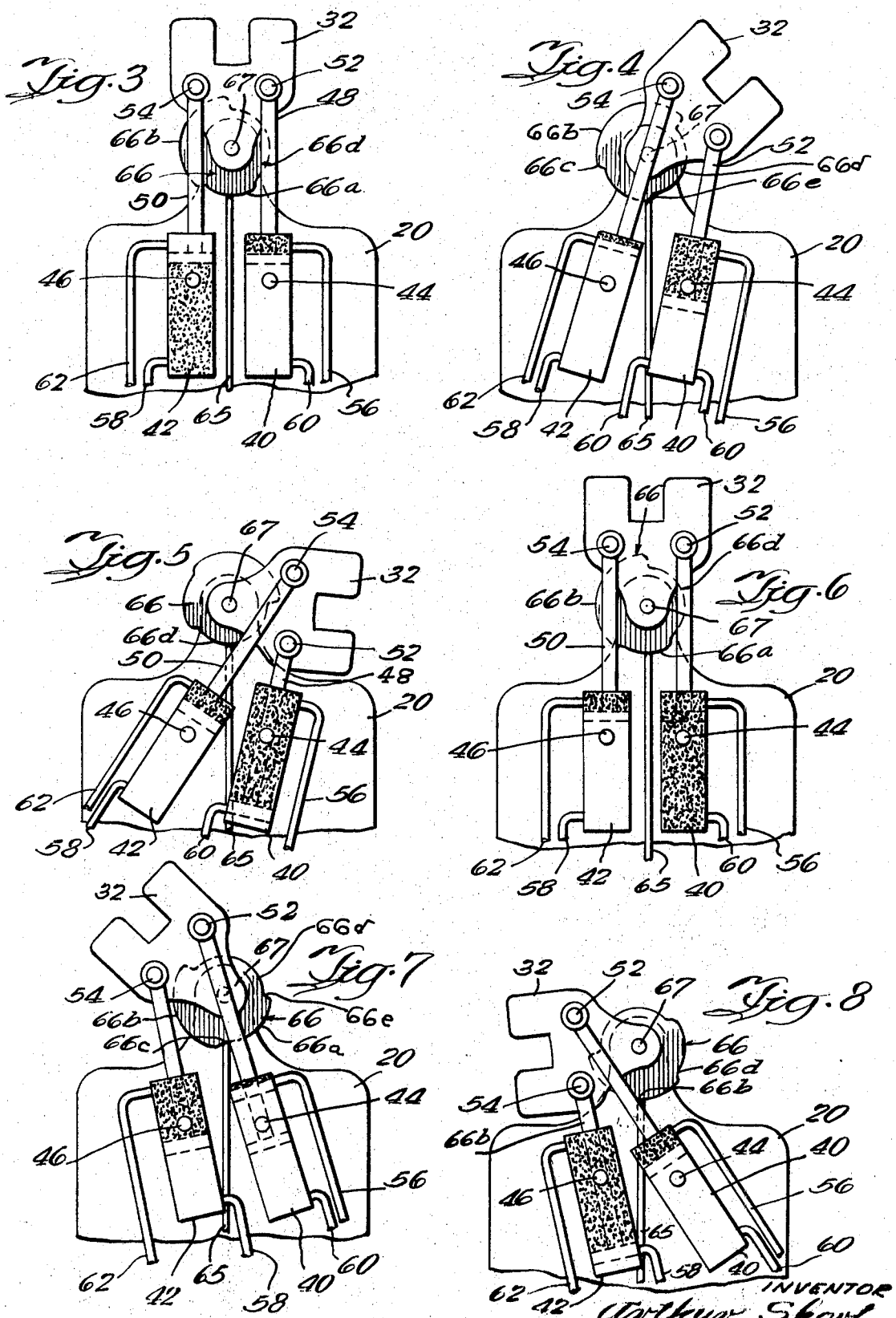

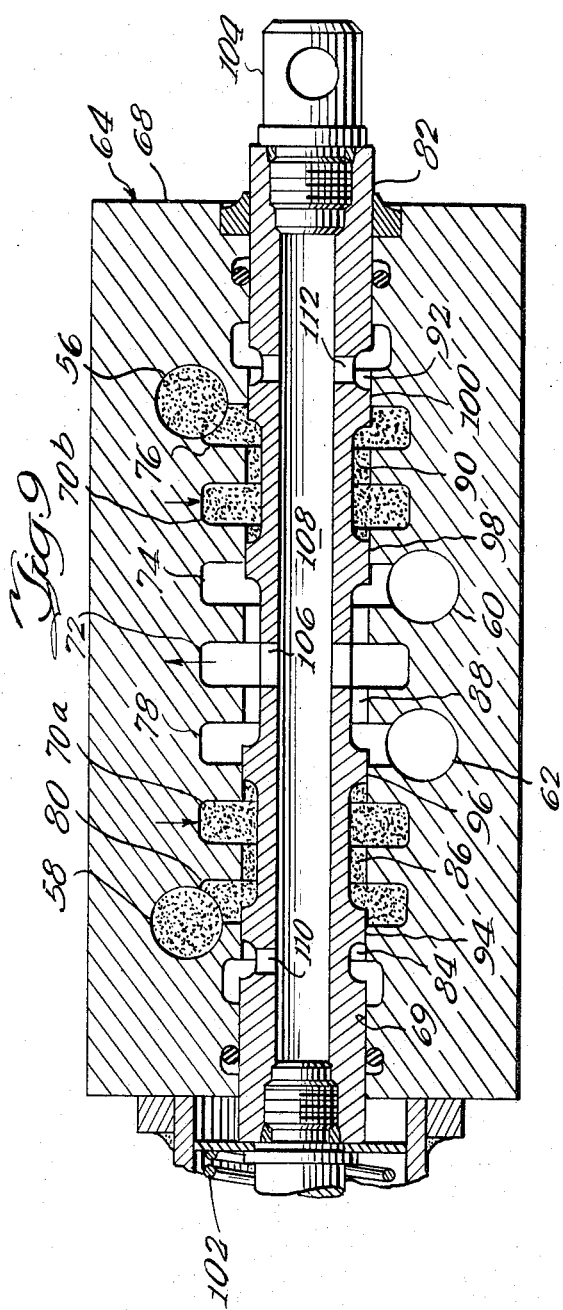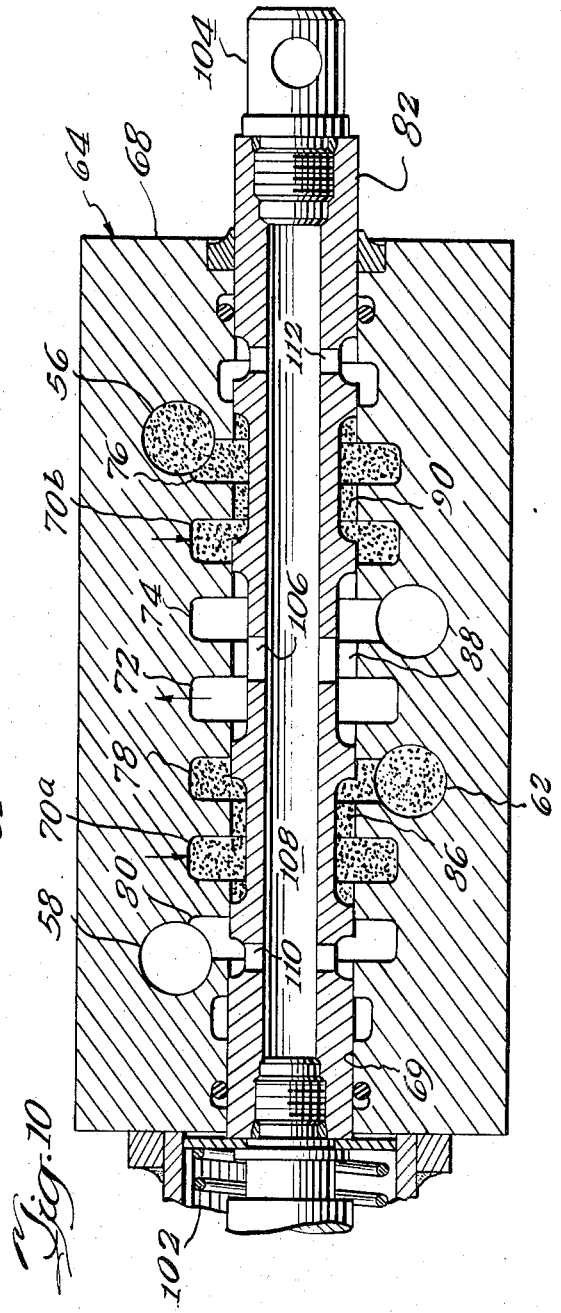

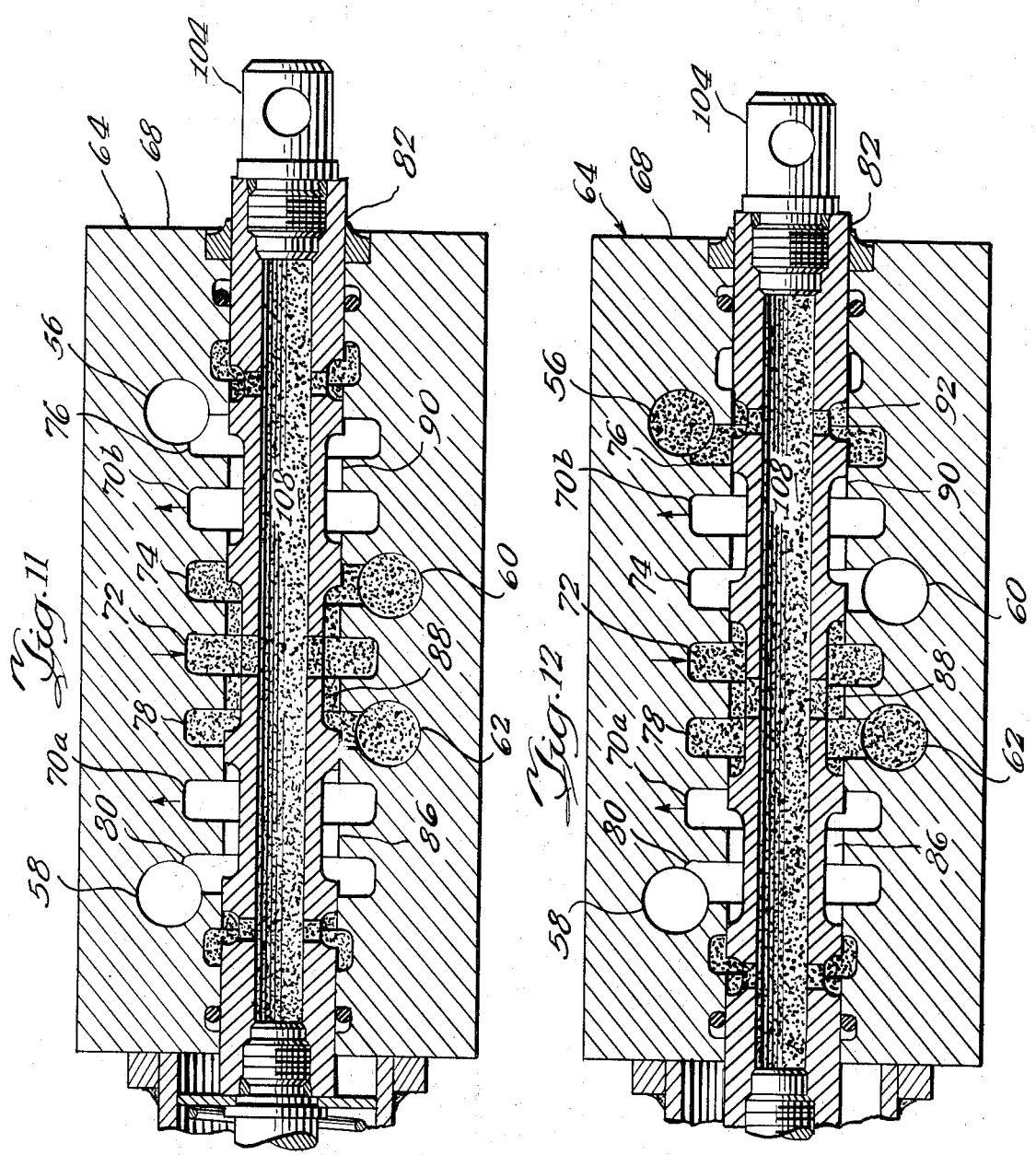

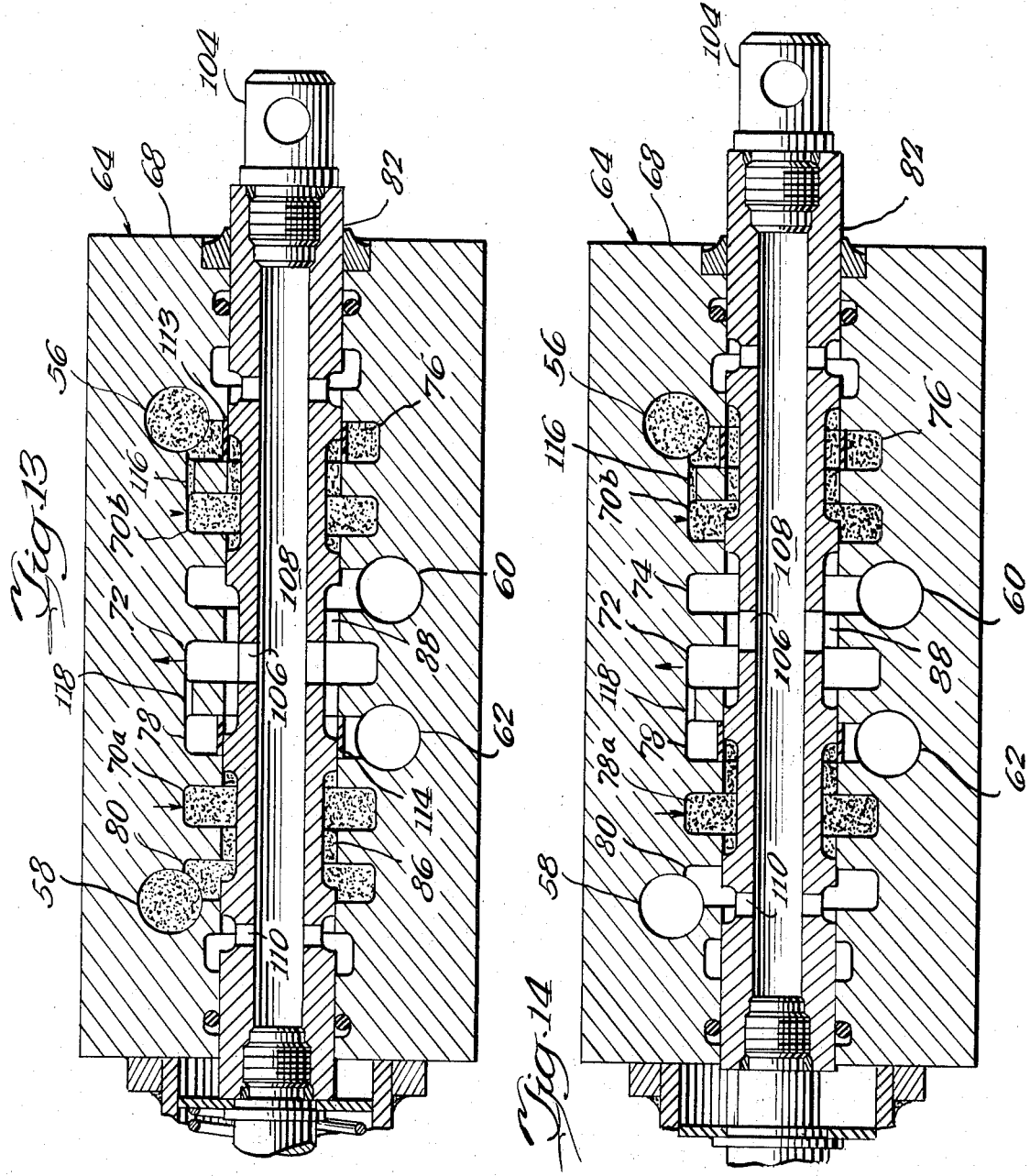

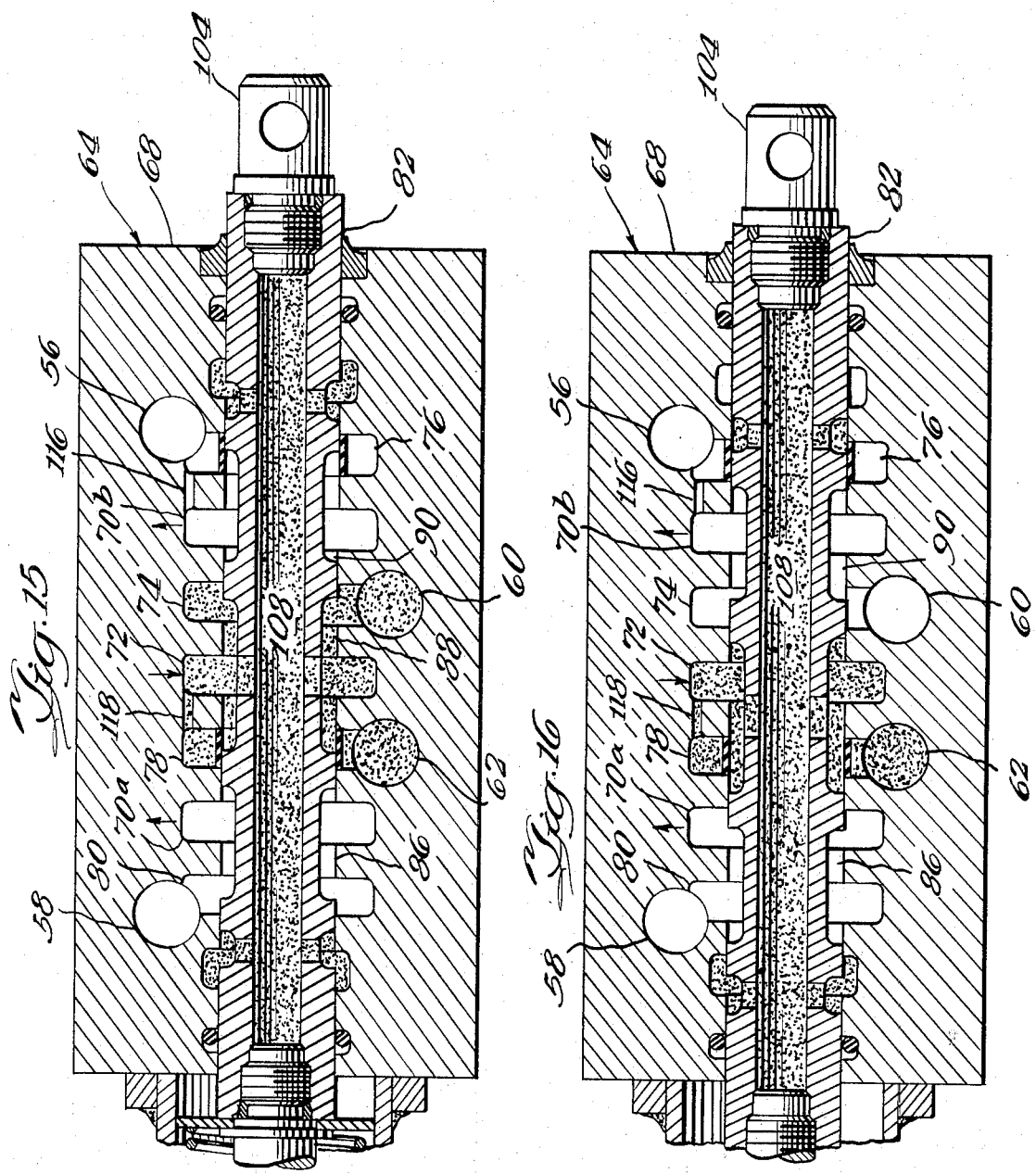

HYDRAULIC CONTROL VALVE CIRCUIT

This is a continuation of Application Ser. No. 13,582, filed Feb. 24, 1970, now abandoned.

BACKGROUND

Hydraulically controlled material handling devices such as loaders or backhoes mounted on tractors are well known. Typical backhoe arrangements include an articulated mechanism such as a boom supported on the tractor for vertical and lateral pivotal or rotational movement, a dipper stick pivoted at one end of the boom carrying at its free end a pivotally mounted bucket. Such mechanisms are usually operated by hydraulic systems including hydraulic motors connected thereto and operable to cause pivotal movement of each member.

Backhoe mechanisms usually include a boom hydraulic motor connected between the boom and a support member and operable to raise and lower the boom, a dipper stick hydraulic motor connected between the boom and the dipper stick and adapted to cause relative pivotal movement therebetween and a bucket hydraulic motor connected between the bucket and the dipper stick for pivoting the bucket relative thereto. Backhoes are rotated laterally relative to their support typically by the use of at least a pair of hydraulic motors connected between the backhoe and the support.

In such embodiments, the hydraulic motors are connected to the boom of the backhoe on opposite sides of the vertical axis of the pivotal connection between the backhoe and the support. In such configurations, the hydraulic motors may operate in opposite directions in order to rotate the backhoe boom laterally. Thus, for example, when the motors take the form of hydraulic cylinders, one of the cylinders initially contracts and the other expands during initial lateral rotation of the backhoe configuration.

Since the arc through which such backhoes swing typically is in the neighborhood of 190°, one of the hydraulic motors typically applies the primary force to rotate the backhoe to one side of its mid-point in the arc of rotation, and the other motor applies the primary force to rotate the backhoe in the other direction from the mid-point of the arc of rotation. In such configurations, the remaining or secondary cylinder while initially applying an equal force at the mid-point, in usually connected so that the effective lever arm of this secondary hydraulic motor is reduced as the backhoe boom rotates towards one of its extreme positions. At some point during this movement, the effective lever arm of the secondary hydraulic motor decreases to zero, and continued rotation of the backhoe causes the secondary hydraulic motor to reverse its operation, thereby working against the primary motor and opposing continued rotation of the backhoe boom towards its extreme position.

Various attempts have been made to overcome this decrease in the effective force applied to rotate the backhoe boom, such as, for example, the use of supplemental hydraulic motors to counteract the opposition of the secondary hydraulic motor, or the alteration of the physical relationship and arrangement of the hydraulic motors. These attempts have not been particularly satisfactory and furthermore, often involve deviations which reduce the efficiency of the hydraulic system or require considerable excess equipment adding to the complexity and cost of the system.

SUMMARY

In accordance with the present invention, there is provided a hydraulic system for rotating a movable member through an arc of rotation including a switching valve connected between a source of hydraulic pressure and the pair of hydraulic motors connected to rotate the movable member, such as the backhoe hydraulic boom. The system of the present invention requires a minimum of additional equipment, and allows the hydraulic motors to be arranged in the most desirable configuration.

Hydraulic pressure for operating the hydraulic motors is connected thereto through a hydraulic switching valve operable in response to the position of the movable member being operated by the hydraulic cylinders. As the movable member reaches an intermediate position whereby the secondary hydraulic motor begins to oppose further rotation of the movable member, the switching valve operates to modify the hydraulic connections to the secondary cylinder to eliminate this opposition. The switching valve is responsive to each such intermediate position of the movable member wherein the hydraulic connections to the then secondary hydraulic motor are to be modified.

More specifically, the hydraulic switching valve includes a pair of input ports for connection to a source of hydraulic pressure and to a hydraulic sump, and a plurality of output ports hydraulically coupled to the hydraulic motors, there being one output switching valve port for each connection to each hydraulic motor.

Upon actuation of the switching valve in one embodiment, the hydraulic connections to the secondary hydraulic motor are modified to neutralize the secondary hydraulic motor, thereby allowing it to "float" as the primary motor continues to apply the desired force to the movable member. In an alternative embodiment, the hydraulic connections to the secondary hydraulic motor are reversed. After such a reversal, the secondary motor continues to supplement the primary motor rather than oppose it. When the movable member is rotated in the other direction, the switching valve similarly modifies the hydraulic connections to the other, now secondary hydraulic motor.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

FIGS. 3, 4 and 5 are diagrammatic plan views showing the relationship of the hydraulic cylinders and the boom yoke as the boom rotates to the right;

FIGS. 6, 7 and 8 are diagrammatic plan views showing the relationship of the hydraulic cylinders and the boom yoke as the boom rotates to the left;

FIGS. 9 and 10 show the operation of one embodiment of the switching valve when the boom rotates to the right;

FIGS. 11 and 12 show the operation of the switching valve when the boom rotates to the left;

FIGS. 13 and 14 show an alternate embodiment of the switching valve when the boom rotates to the right; and FIGS. 15 and 16 show the alternate embodiment of a switching valve when the boom rotates to the left.

Figure 1:
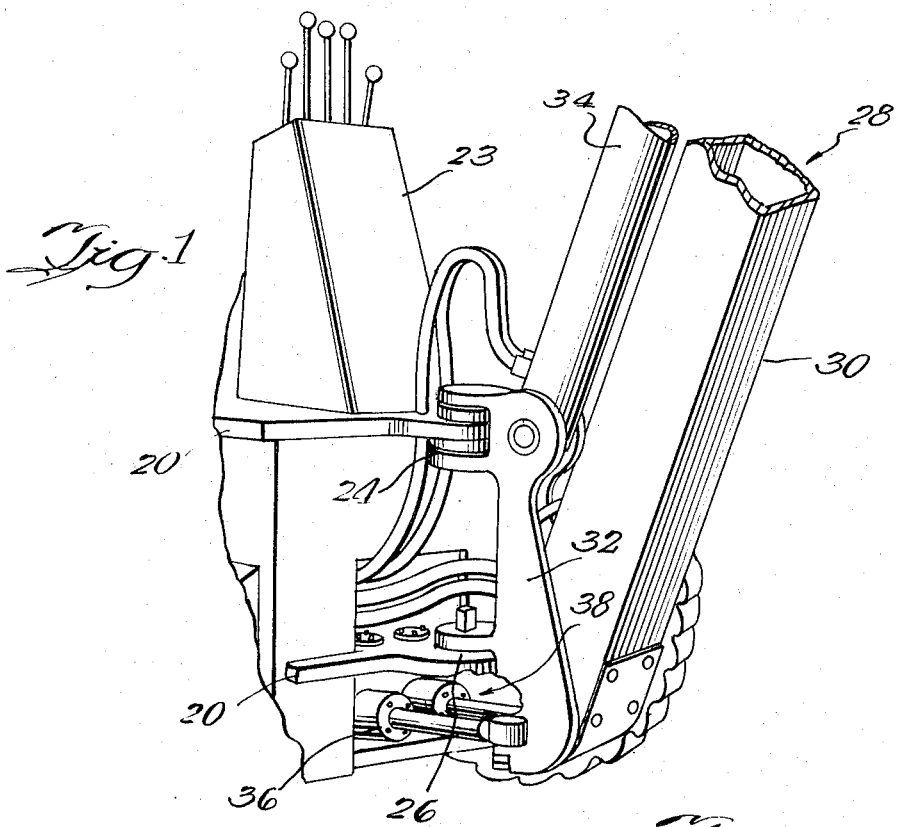
FIG. 1 is a perspective view of a backhoe showing a pair of hydraulic cylinders for laterally rotating the backhoe boom.

In FIG. 1 there is shown a partial view of a support structure 20 which typically may be mounted on a tractor (not shown) having a control station 23 which includes suitable control valves for selectively applying hydraulic pressure to various hydraulic motors utilized in the system. The support structure 20 includes a pair of pivots 24, 26 on which the member to be moved may be mounted. For illustrative purposes, the movable member is illustrated as a backhoe 28, although it should be understood that the present invention is applicable to other systems for use with other structures such as, for example, articulated steering systems.

In the case of a typical backhoe, the movable member includes a boom member 30 pivotally mounted in a yoke 32 for vertical movement (the other elements not being shown). The yoke 32 is pivotally supported on pivots 24, 26 for lateral rotation.

The boom 30 is raised and lowered by the application of hydraulic pressure to either end of a double acting hydraulic boom motor 34 and is rotated laterally by the selective application of hydraulic pressure to a pair of hydraulic motors 36, 38 connected to the yoke 32 on opposite sides of the vertical axis of the pivots 24, 26.

The hydraulic motors 36, 38, as can be seen clearly in FIGS. 3–8, each include a hydraulic cylinder 40, 42, each pivotally mounted intermediate its ends at 44, 46 to the support 20. Each of the cylinders 40, 42 has a piston rod 48, 50 extending out of one end thereof and pivotally connected to the yoke 32 at points 52, 54. Hydraulic conduits 56, 58, 60, 62 are connected respectively to opposite ends of each of the hydraulic cylinders 40, 42 and are connected to a source of hydraulic pressure (not shown) to initiate rotation of the boom 30 in response to selected application of the hydraulic pressure as explained in more detail below. A switching valve 64 is disposed in the hydraulic circuit to modify the application of hydraulic pressure to the hydraulic cylinders 40, 42 in response to the lateral position of the boom 30, the operation of the valve being controlled by a cam follower 65, the end of which rides on a cam 66 attached to the yoke 32.

In the illustrated embodiment, the cam 66 has a first portion 66a of intermediate radius, a second portion 66b of radius larger than the first portion 66a and connected thereto by an offset portion 66c, and a third portion 66d of radius less than the first portion 66a and connected thereto by another offset portion 66e.

Referring to FIGS. 3, 4 and 5, it can be seen that when the boom 30 is to be moved to the right (clockwise as seen in the drawings), hydraulic pressure must be applied to the right cylinder 40 through conduit 56 and to the left cylinder 42 through conduit 58, with conduits 60, 62 being connected to the sump (not shown). The boom 30 is thus rotated to the right which movement continues in response to torque applied from both cylinders 40, 42 until a point is reached where the moment arm of the left or secondary cylinder 42, decreases to zero as the piston rod 50 crosses the axis of the rotation 67 between the pivots 24, 26. As the boom 30 continues to rotate to the right, it can be seen that the movement of the piston rod 50 of the secondary cylinder 42 reverses and in the absence of any modification of the hydraulic circuit opposes the hydraulic pressure applied through conduit 58. As a result, the net applied torque decreases rapidly as seen by curve A in FIG. 2, since the secondary hydraulic cylinder 42 opposes continued rotation of the boom 30.

Similarly, as seen in FIGS. 6, 7 and 8, when the boom 30 is rotated to the left, the left or primary cylinder 42 applies the primary force to rotate the boom 30 to the left with sufficient torque to overcome the opposition of the secondary cylinder 40 as it crosses the axis 67 and begins to exert an opposing force. Although the force is markedly decreased as the boom approaches its extreme position, the increased moment arm of the primary hydraulic cylinder 42 overcomes the opposition of the secondary cylinder 40, but with a greatly reduced not applied force.

Figure 2:
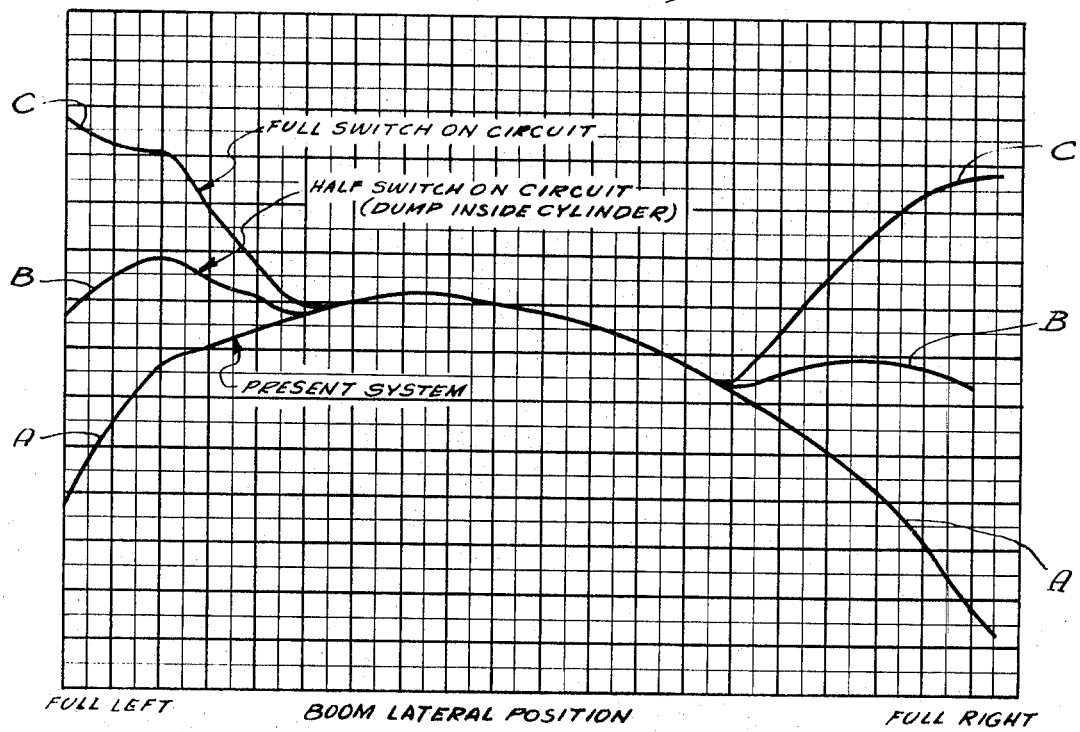
FIG. 2 is a chart depicting the effect of the system of the present invention.

The hydraulic connections to the cylinders 40, 42 are suitably modified by the switching valve 64 disposed in the hydraulic circuit. The switching valve 64, which is responsive to the position of the boom 30 to modify the hydraulic connections to the secondary cylinder to either neutralize that cylinder and maintain the net applied force (FIG. 2, curve B), or to reverse the connections to substantially increase the available force as the rotation of the boom 30 continues (FIG. 2, curve C).

It should also be noted that the swing speed of the movable member is also affected by operation of the switching circuit of the present invention. Under normal operation, the swing speed of the movable member would increase as the piston rod of the secondary cylinder passed over the center line since it would now operate to increase the supply of hydraulic fluid. The operation of the switching valve of the present invention maintains swing speed constant or decreases the swing speed, depending upon the configuration of the switching valve used, while maintaining the torque substantially constant or increasing the torque as reflected in curves B and C of FIG. 2, respectively.

In the embodiment of FIGS. 9, 10, 11 and 12, the switching valve 64 includes a valve body 68 having a generally axial bore 69 extending therethrough intermediate the ends of which are a set of primary or control ports 70a, 70b, 72 and cylinder ports 74, 76, 78, 80 in the form of circumferential recesses surrounding the bore 69.

A hollow valve spool 82 having five recessed portions 84, 86, 88, 90, 92 disposed intermediate its ends divided respectively by circumferential land portions 94, 96, 98, 100 is slidably mounted in the bore 69 and biased towards one end by suitable biasing means such as a spring 102 disposed at one end thereof. The other end 104 of the valve spool 82 extends out from the valve body 68 and is suitably connected to the cam follower 65 which is responsive to the position of the boom 30 for reciprocating the valve spool 82 into the valve body 68 as the cam follower rides along the surface of cam 66.

The valve spool 82 includes a central radial aperture 106 extending through the central recessed portion 88 into the hollow center 108 of the valve spool 82. The valve spool 82 also includes a left radial aperture 110 passing from the hollow center 108 to the left spool recess 84 and a right radial aperture 112 passing from the hollow center 108 to the right spool recess 92.

In operation, when it is desired to rotate the boom 30 to the right from its mid-point, hydraulic pressure is applied to the switching valve control ports 70a, 70b with the swtiching valve control port 72 connected to the hydraulic sump. Referring to FIGS. 3 and 9, it can be seen that the applied hydraulic pressure passes from control port 70a through valve spool recess 86, to cylinder port 80 and from there through conduit 58 and to the cylinder 42; and from control port 70b through valve spool recess 90, to cylinder port 76 and from there through conduit 56 to the cylinder 40. Conduits 60, 62 are connected to the sump through cylinder ports 74, 78, spool recess 88 and control port 72.

With the cylinders 40, 42 so connected, both initially cooperate to rotate the boom 30 to the right until the position illustrated in FIG. 4 is achieved. At that point, the moment arm of secondary cylinder 42 has decreased to zero, and additional rotation of the boom 30 to the right reverses the action of the secondary piston rod 50 to move it against the normal applied hydraulic pressure as is seen in FIG. 5. At about this position as shown in FIG. 4, the cam follower 65 passes over offset portion 66e and; the valve spool 82 moves to the right, as seen in FIG. 10, under action of the bias spring 102, to modify the hydraulic connections to the secondary hydraulic cylinder 42.

As a result, conduit 58 is connected to the sump through cylinder port 80, left radial aperture 110, valve spool hollow center 108, central aperture 106 and control port 72. Hydraulic conduit 62 is connected to the hydraulic pressure source through cylinder port 78, left center spool recess 86 and control port 70a. Thus, the hydraulic connections to the secondary cylinder 42 are reversed so that it continues to assist in the rotation of the boom 30 to the right.

If, as seen in FIGS. 6, 7 and 8, it is desired to rotate the boom to the left, the source of hydraulic pressure is initially connected to conduits 60, 62 through control port 72, spool recess 88 and cylinders ports 74, 78, while the hydraulic sump is connected to conduit 56 through control port 70b, spool recess 90 and cylinder port 76, and to conduit 58 through control port 70a, spool recess 86 and cylinder port 80. Again, as the boom reaches the point where the moment arm of the secondary cylinder, this time the right cylinder 40 reaches zero, the valve spool 82 is pushed to the left, as seen in FIG. 12, by the cam follower 65 as it traverses offset portion 66c of the cam 66 to reverse the hydraulic connections to the secondary cylinder 40. At this point, conduit 56 is connected to the pressure source through cylinder port 76, right spool recess 92, right radial aperture 112, the valve spool hollow center 108, central aperture 106, central spool recess 88 and control port 72. Conduit 60 is connected to the hydraulic sump through cylinder port 74, spool recess 90 and control port 70b.

In the alternative embodiment of the switching valve shown in FIGS. 13, 14, 15 and 16, the operation of the valve is the same as previously described with the exception that cylinder ports 76 and 78 are permanently closed at 113, 114 internally of the valve. In addition, cylinder port 76 is permanently connected to control port 76b through a suitable external connection 116, while cylinder port 78 is permanently connected to control port 72 by an external connection 118.

It can be seen, that when the valve operates as described above, the secondary cylinder, whichever it may be, will be neutralized by connecting the conduit which initially was connected to the hydraulic pressure source to the hydraulic sump. Thus, both of the secondary valve conduits are connected to the sump allowing the piston of the secondary cylinder to float as the boom continues to be rotated under control of the primary cylinder.

Thus, there has been disclosed a hydraulic system incorporationg a switching valve for modifying the hydraulic connections to either of a pair of hydraulic motors connected to rotate a movable member whereby that hydraulic motor does not oppose full rotation of the movable member. This result is effected simply and economically by selectively modifying the hydraulic connections to the cylinder of that motor at the point wherein its operation would, if unmodified, begin to exert such an opposing force. Therefore, the most desirable arrangement of the motors can be utilized without concern that one of the hydraulic motors will exert an opposing force to prevent proper operation and movement of the moveable member.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In a backhoe mounted on a tractor, the combination of a support on the rear end of the said tractor; a boom pivotally mounted on said support at a first pivot for rotation between extreme lateral positions about a substantially vertical pivot axis; first and second hydraulic motor means each having first and second relatively movable elements, one of said elements of each motor means being pivotally connected to said support and the other of said elements being pivotally connected to said boom; a source of fluid under pressure; a reservoir; conduit means connecting said source and reservoir to opposite ends of said first element of each hydraulic motor means; and control valve means in said conduit means, said control valve means having a first position for supplying fluid under pressure to one end of each of said first elements and connecting the opposite ends to said reservoir to rotate said boom between said extreme positions and a second position for allowing free floating movement of the elements of one of said hydraulic motor means when its pivots are on a line intersecting said first pivot while continuing rotation of said boom with said other motor means.

2. A backhoe as defined in claim 1 in which said first elements are fluid cylinders and said second elements are piston rods slidable relative to said cylinders.

* * * * *